(12) United States Patent
Watanabe

(10) Patent No.: US 7,695,856 B2
(45) Date of Patent: Apr. 13, 2010

(54) DEFORMATION RESISTANT BATTERY, GROUP-BATTERY, MULTIPLE GROUP-BATTERY AND AUTOMOBILE THEREWITH

(75) Inventor: Kyoichi Watanabe, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 523 days.

(21) Appl. No.: 10/462,668

(22) Filed: Jun. 17, 2003

(65) Prior Publication Data

US 2004/0002001 A1  Jan. 1, 2004

(30) Foreign Application Priority Data

Jun. 26, 2002 (JP) ............... P 2002-186104

(51) Int. Cl.
*H01M 2/14* (2006.01)
*H01M 2/02* (2006.01)
*B32B 27/00* (2006.01)
*B32B 15/08* (2006.01)
*B32B 15/04* (2006.01)
*B32B 7/02* (2006.01)

(52) U.S. Cl. ............ 429/131; 429/181; 429/185; 428/461; 428/458; 428/344; 428/347; 428/910; 428/213; 428/215

(58) Field of Classification Search ............ 429/131, 429/181, 185; 428/461, 458, 344, 347, 910, 428/213, 215

See application file for complete search history.

(56) References Cited

U.S. PATENT DOCUMENTS

| 4,623,598 | A | * | 11/1986 | Waki et al. ............... 429/162 |
| 5,635,814 | A | * | 6/1997 | Afzal et al. ............... 320/111 |
| 5,693,430 | A | * | 12/1997 | Iwatsu et al. .............. 429/72 |
| 6,329,101 | B1 | * | 12/2001 | Kawakami ............... 429/218.2 |
| 6,632,538 | B1 | * | 10/2003 | Yamazaki et al. ......... 428/461 |
| 6,841,298 | B2 | * | 1/2005 | Yamashita et al. ........ 429/179 |

FOREIGN PATENT DOCUMENTS

| JP | 9-73915 | 3/1997 |
| JP | 10-125291 | 5/1998 |
| JP | 2002-134094 A | 5/2002 |
| WO | WO/01/80330 | * 10/2001 |

OTHER PUBLICATIONS

Wikipedia, http://en.widipedia.org/wiki/Work_hardening.*
Jeff Stein, The Random House College Dictionary, 1980, Revised, Section F, pp. 509.*

* cited by examiner

*Primary Examiner*—Patrick Ryan
*Assistant Examiner*—Helen O Conley
(74) *Attorney, Agent, or Firm*—McDermott Will & Emery LLP

(57) ABSTRACT

A battery of the present invention is provided with positive and negative terminals led out of the battery and one or more sealing members filled between the positive and negative terminals and the battery. Each of the sealing members is provided with one or more resin layers, each of which is provided with one or more non-molecular-oriented resin layers.

16 Claims, 19 Drawing Sheets

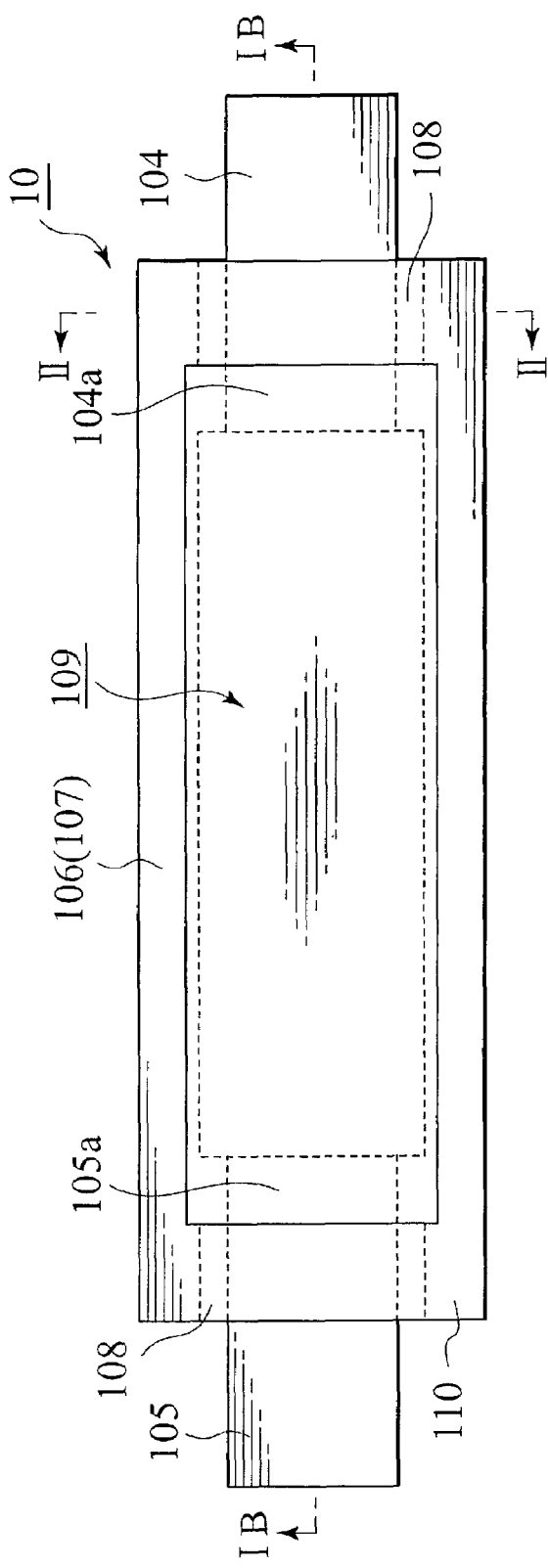
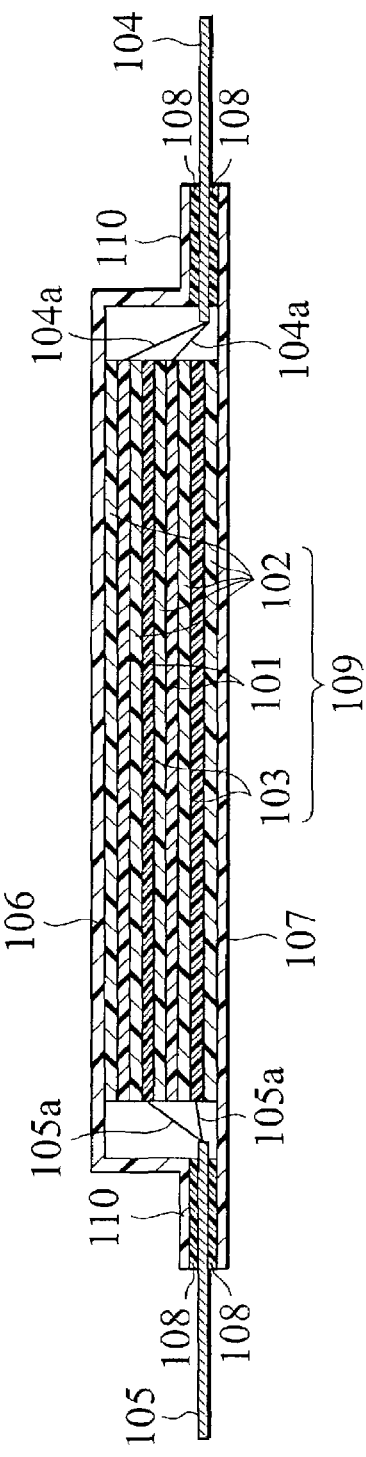

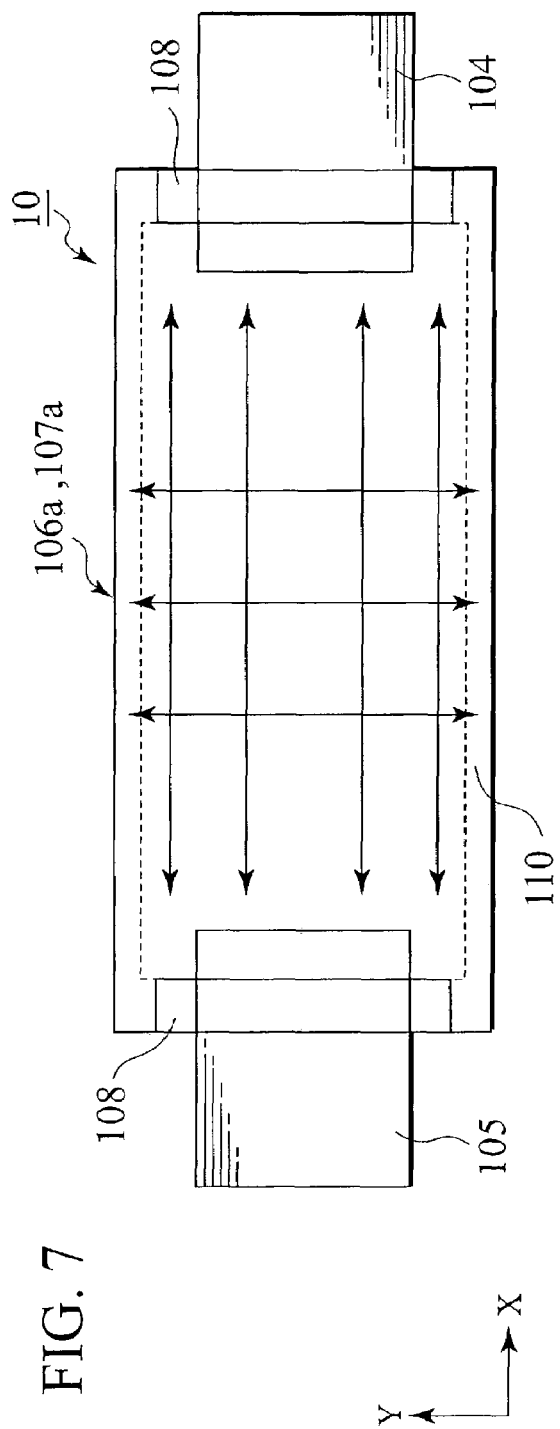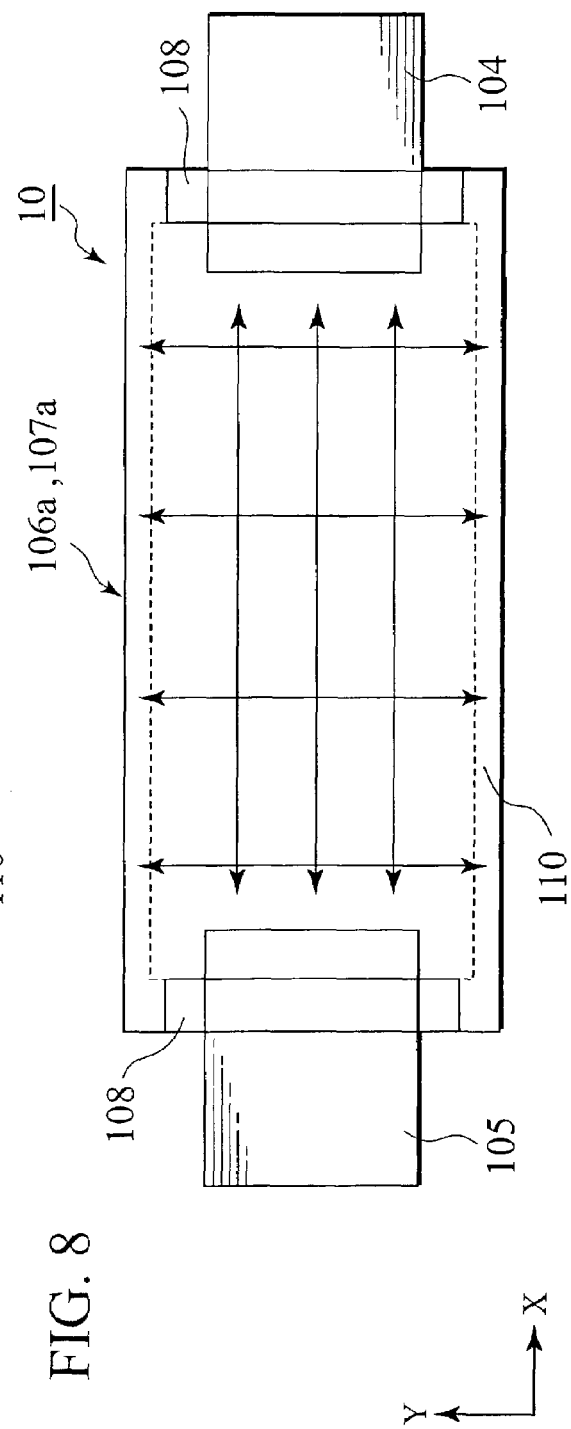

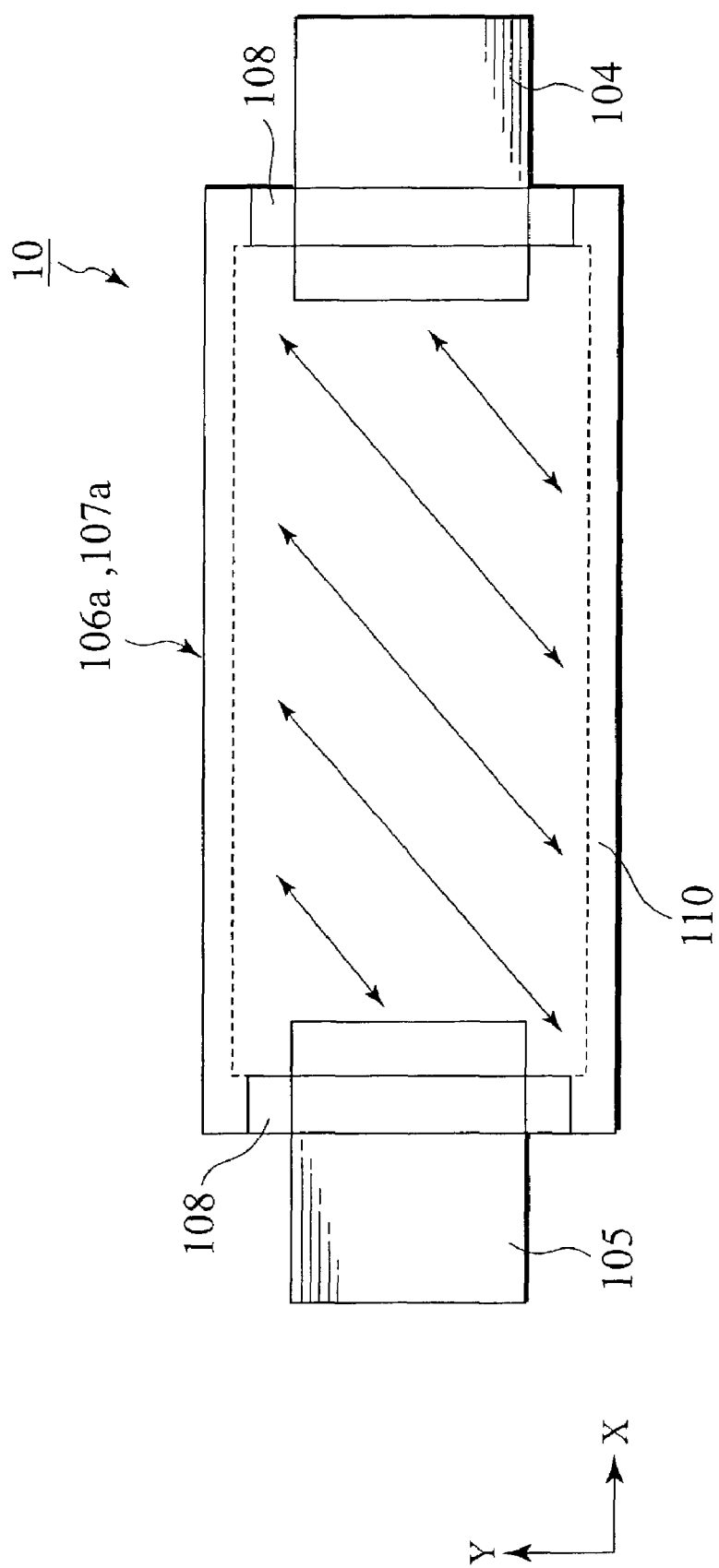

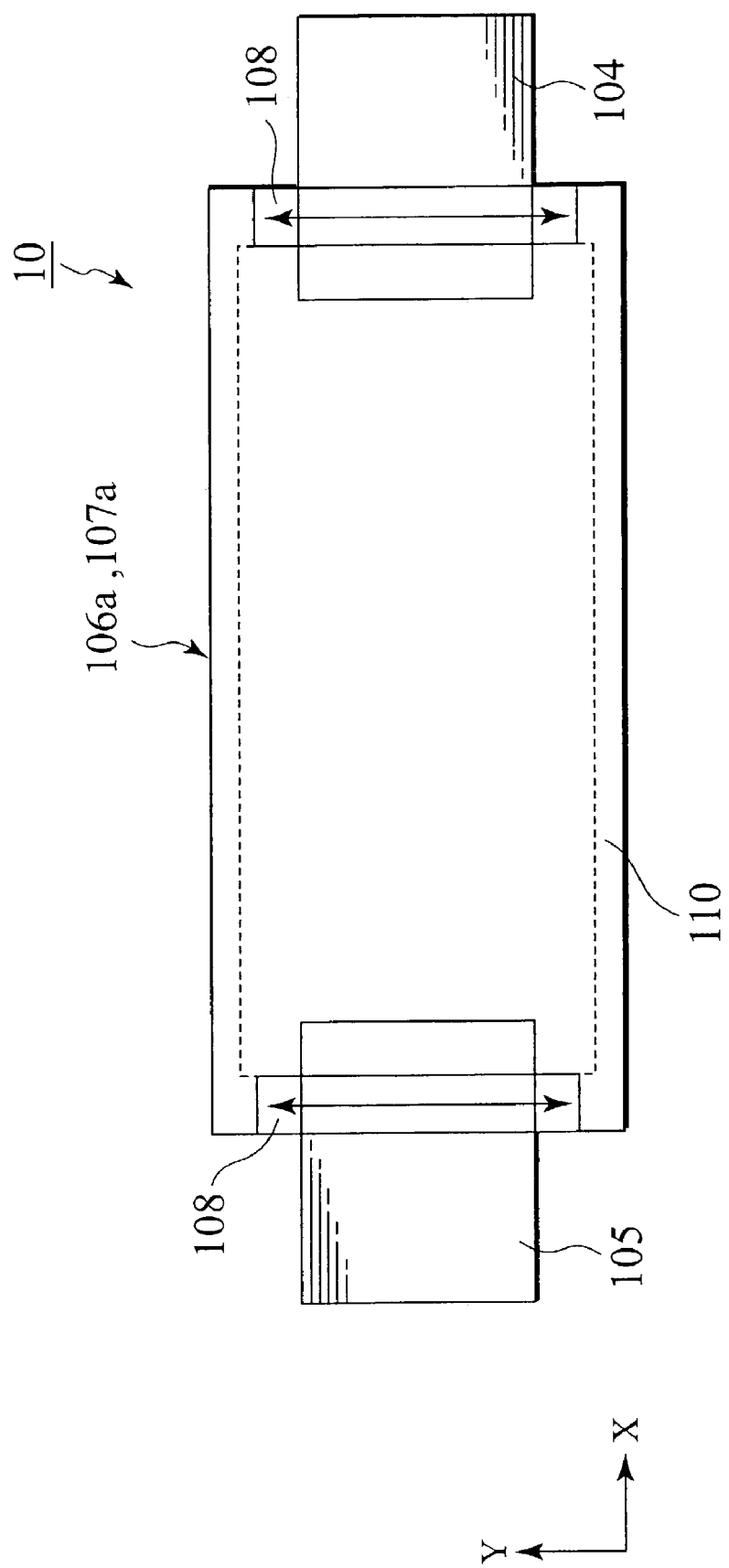

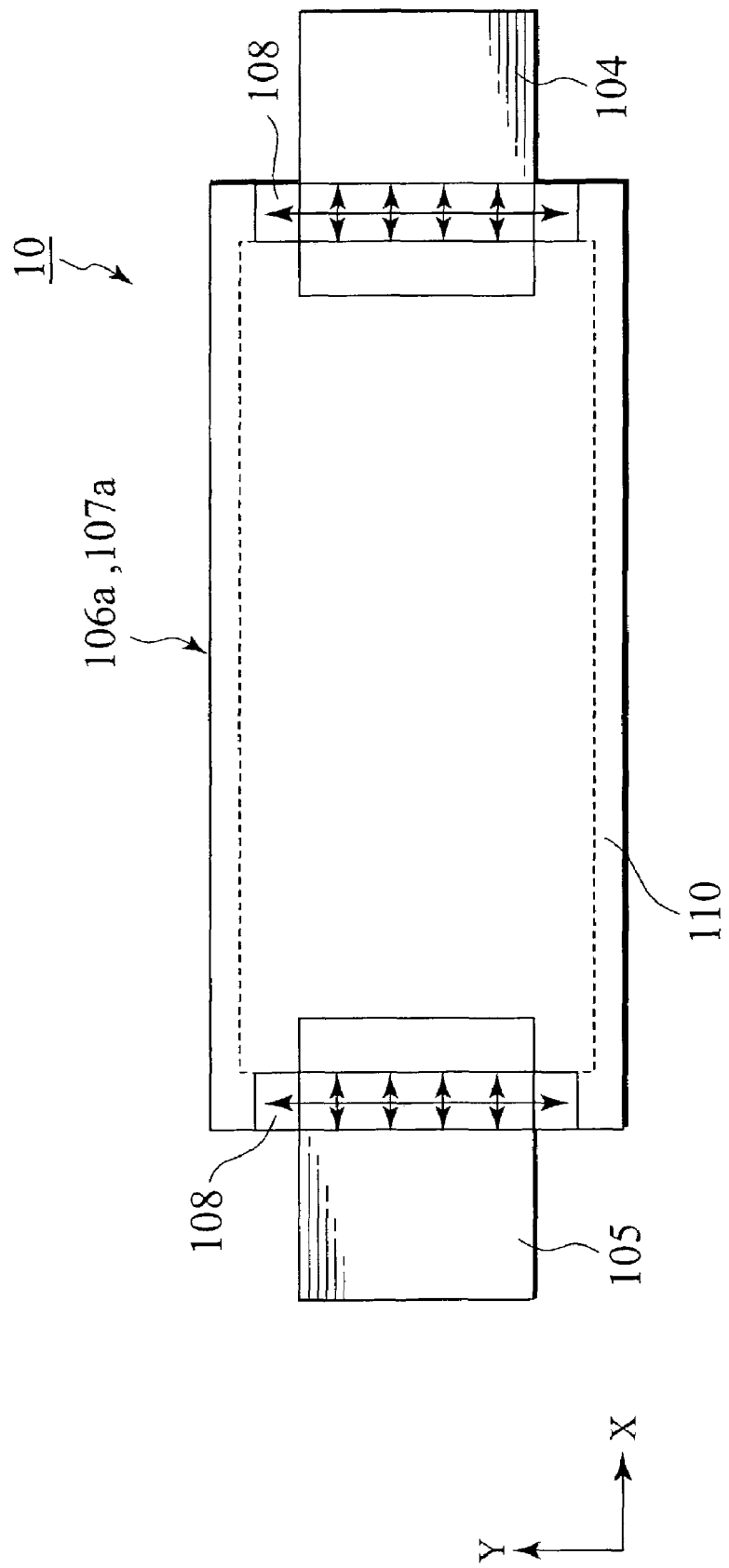

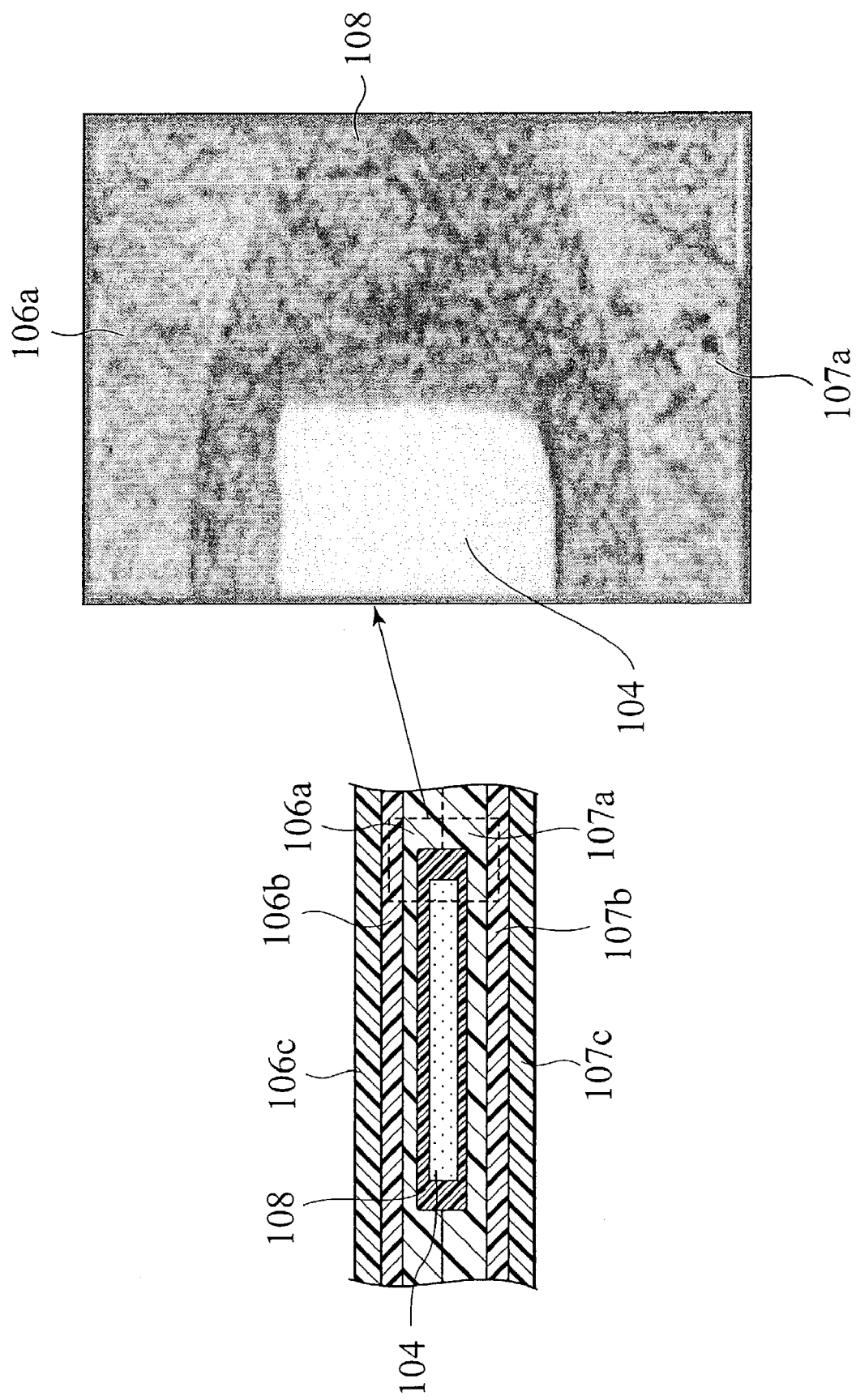

US 7,695,856 B2

DEFORMATION RESISTANT BATTERY, GROUP-BATTERY, MULTIPLE GROUP-BATTERY AND AUTOMOBILE THEREWITH

BACKGROUND OF THE INVENTION

1. Field of the Invention

The present invention relates to a battery which is resistant to deformation and an automobile provided therewith.

2. Description of the Related Art

To gain an energy density in terms of volume, compact batteries are intently under development. A battery formed in a thin shape is proposed, in which one or more pairs of film-like cathodic electrodes and film-like anodic electrodes are alternately accumulated with separators put therebetween and the electrodes and electrolyte are water-tightly cased. To supply electric power to an outside, terminals need to be led out of the case of the battery with sealing means so that the electrolyte is prevented from leaking out.

SUMMARY OF THE INVENTION

Deformation of the battery arising from an external force leads to a concern about a failure of a water-tight or sealing structure thereof and leakage of the electrolyte, which causes a performance decrement or a malfunction of the battery. A possibility of the concern is higher in a case where the battery is formed thinner because the sectional area thereof comes to be smaller so that the applied stress comes to be larger.

The present invention is achieved in a view of the above problem and is intended for provision of a battery which is resistant to a deformation stress.

A battery of the present invention is provided with positive and negative terminals led out of the battery and one or more sealing members filled between the positive and negative terminals and the battery. Each of the sealing members is provided with one or more resin layers, each of which is provided with one or more non-molecular-oriented resin layers.

BRIEF DESCRIPTION OF THE DRAWINGS

FIG. 1A is a plan view of a battery according to an embodiment of the present invention;

FIG. 1B is a sectional front view of the battery, which is taken along a line IB-IB of FIG. 1A;

FIG. 7 is a schematic drawing showing a direction of a film orientation of a first resin layer and a seal film according to a third modification of the embodiment;

FIG. 8 is a schematic drawing showing a direction of a film orientation of a first resin layer and a seal film according to a fourth modification of the embodiment;

FIG. 9 is a schematic drawing showing a direction of a film orientation of a first resin layer and a seal film according to a fifth modification of the embodiment;

FIG. 10 is a schematic drawing showing a direction of a film orientation of a first resin layer and a seal film according to a sixth modification of the embodiment;

FIG. 11 is a schematic drawing showing a direction of a film orientation of a first resin layer and a seal film according to a seventh modification of the embodiment;

FIG. 20 is a micrographic drawing of a lead-out terminal of a battery according to a first example of the present invention.

DETAILED DESCRIPTION OF THE PREFERRED EMBODIMENT

Figure 2:
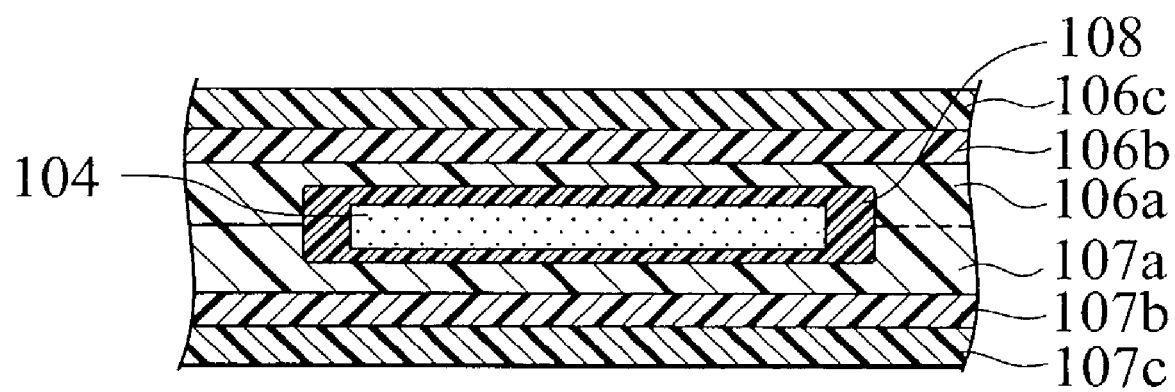
FIG. 2 is a sectional side view of the battery, which is taken along a line II-II of FIG. 1B.
Figure 3:
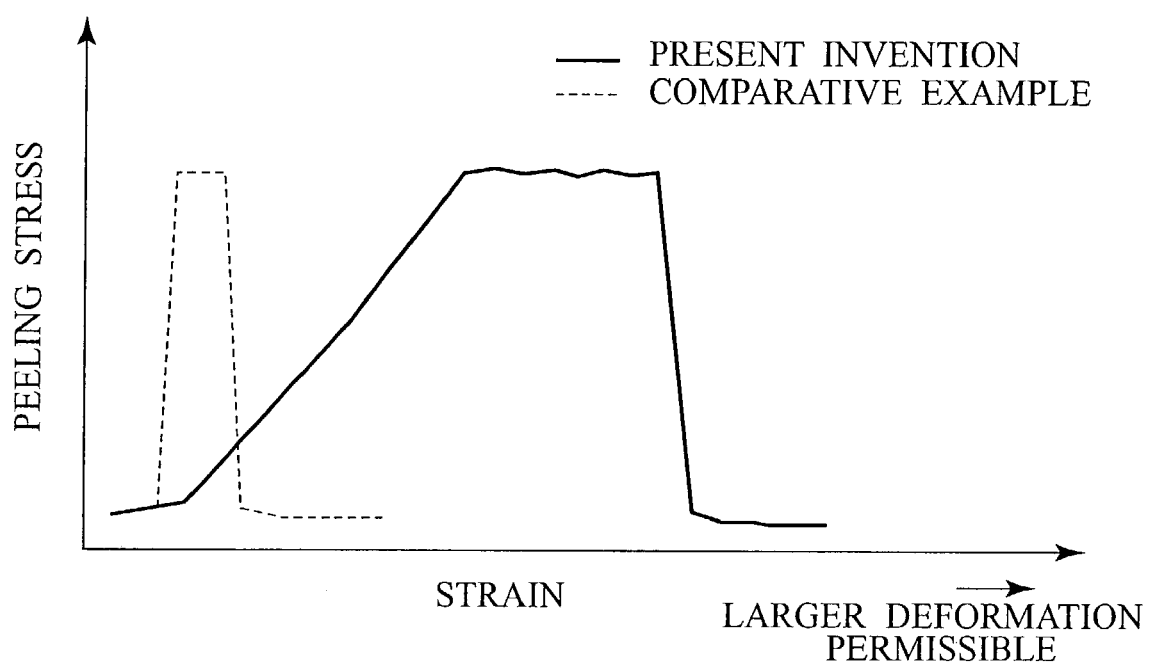
FIG. 3 is a graph showing a stress-strain relation of a lead-out terminal of the battery according to the embodiment of the present invention and a comparative example.

An embodiment of the present invention will be described hereinafter with reference to FIGS. 1-20. Though the embodiment will be described taking a lithium secondary battery for instance, any other types of batteries can be employed in the present invention.

Throughout the specification, "molecular orientation treatment" means "treatment in which a resin film is drawn so that molecular structure thereof is oriented in the drawing direction", "molecular-oriented" means "treated with the molecular orientation treatment" and "non-molecular-oriented" means "not treated with any deformation treatments including a molecular orientation treatment except for unavoidable deformation accompanying a production process thereof, for example, tension-rolling". Furthermore, "low-profile battery" means "battery formed in a thin shape".

A low-profile battery 10 is provided with two sheets of cathodic electrodes 101, five sheets of separators 102, two sheets of anodic electrodes 103, a positive terminal 104, a negative terminal 105, an upper casing 106, a lower casing 107, sealing films 108 and electrolyte (not shown). Among them, a set of the cathodic electrodes 101, the separators 102 and the anodic electrodes 103 forms a power generation element 109.

The separators 102 are respectively put between the cathodic electrodes 101 and the anodic electrodes 103. The number of the cathodic electrodes 101, the anodic electrodes 103 and the separators 102 is not limited as described above and can be properly determined. For example, the low-profile battery 10 can be constructed of a pair of anodic and cathodic electrodes 101, 103 and three sheets of separators 102.

The cathodic electrode 101 is essentially made of a cathodic active material such as metal oxides, a conductive material such as a carbon black, an adhesive agent such as a aqueous dispersion of polytetrafluoroethylene and an aluminum foil. The metal oxide, the carbon black and the aqueous dispersion of polytetrafluoroethylene are mixed in a weight ratio of, for example, 100:3:10 so as to form a mixture, in which the mixing ratio of the adhesive agent is calculated from solid portions thereof. The mixture is coated on both surfaces of the aluminum foil and dried. The mixture coated aluminum is rolled and cut in a predetermined size. Then the cathodic electrode 101 is formed.

As the cathodic active material, lithium double oxides such as lithium nickelate ($LiNiO_2$), lithium manganate ($LiMnO_2$), lithium cobaltate ($LiCoO_2$) and chalcogenates are exemplified. These materials have relatively high thermal conductivity so that internal heat produced in the battery is relatively easy to be dispersed. The terminals are not expanded by the heat so that a shearing or tensile stress at an interface between the terminal and a seal film to be described is suppressed to be relatively low.

The anodic electrode 103 constituting the power generation element 109 is made from an anodic active material, which has an ability to absorb and emit lithium ion from the cathodic active material and amorphous carbon, hard-graphitizing carbon, easy-graphitizing carbon and graphite are exemplified. The anodic active material and an aqueous dispersion of styrene-butadiene rubber resin powder as a precursor of an organic sintered body are mixed in a weight ratio calculated from solid portions thereof of, for example, 100:5. The mixture is dried and broken into fragments so as to form a basic ingredient, in which carbonized styrene-butadiene rubber is supported on surfaces of carbon particles. Binder such as acrylic resin emulsion and the basic ingredient is mixed in a weight ratio of, for example, 100:5. The mixture is coated on a metal foil such as a nickel foil and a copper foil, as a negative electrode collector, and is dried, rolled and cut in a predetermined size so as to form the anodic electrode 103.

Though in a case where the amorphous carbon or the hard-graphitizing carbon is applied as the anodic active material, voltage flatness of the battery in a time of charging and discharging is not excellent so that an output voltage gradually goes down accompanying the discharge thereof, sharp lowering of the electric power is effectively avoided when the battery is employed for an electric vehicle.

The separators 102 are mainly employed for avoiding short circuits between the anodic electrodes 101 and the cathodic electrodes 103. The separators 102 can be given a function of supporting electrolyte. The separator 102 is a porous membrane having fine pores, made of polyolefine such as polyethylene (PE) and polypropylene (PP) and has a function of cutting current when excessive current flows so as to close the fine pores by means of produced heat.

The separator 102 is not limited as a single layer film of the polyolefine but can consists of three-layered film having a polypropylene membrane put between two polyethylene membranes, or accumulated films of polyolefine porous membranes and organic nonwoven clothes. Such multi-layered films provide the other functions of excessive current prevention, electrolyte support, shape suspension or stiffness advancement and such. Instead of the separators 102, gelic electrolyte or intrinsic polymer electrolyte can be employed for the power generation element 109.

In the power generation element 109, the cathodic electrode 101 and the anodic electrode 103 are alternately accumulated and the separators 102 are respectively put therebetween and further accumulated on the top and bottom sides thereof. The cathodic electrodes 101 are connected with the positive terminal 104 via positive electrode collectors 104a and the anodic electrodes 103 are connected with the negative terminal 105 via negative electrode collectors 105a. Both the positive terminal 104 and the negative terminal 105 are formed from metal foils made of electrochemically stable metal. Aluminum, aluminum alloys, copper and nickel are exemplified as a material of the positive terminal 104 and nickel, copper, stainless steels and steel are exemplified as a material of the negative terminal 105. Such metals are appropriate in view of resistivity, linear expansion coefficient and, in a case where an operation temperature is shifted, stress produced in seal films to be described can be relatively suppressed. Though the positive terminal 104 and the negative terminal 105 are extended to form the positive electrode collectors 104a and the negative electrode collectors 105a, the positive electrode collectors 104a and the negative electrode collectors 105a can be separately formed.

The power generation element 109 is water-tightly cased with the upper casing 106 and the lower casing 107. The upper casing 106 essentially consists of a first resin layer 106a, a metal layer 106b and a second resin layer 106c, which are arranged in this order from an inner side to an outer side thereof as shown in FIG. 2, so as to cover an upper side of the power generation element 109 and the electrode collectors 104a, 105a and partly cover an upper side of the positive terminal 104. The first resin layer 106a is made of a resin having a good characteristic in chemical resistant for the electrolyte and thermal fusion adhesion ability such as polyethylene, modified polyethylene, polypropylene, modified polypropylene and ionomer. The second resin layer 106c is made of another resin having a high insulation performance such as polyamide and polyester resin. The metal layer 106b is a metal foil made of, for example, aluminum.

The lower casing 107 has a similar structure as the upper casing 106 and essentially consists of a first resin layer 107a, a metal layer 107b and a second resin layer 107c, which are arranged in this order from an inner side to an outer side thereof, so as to cover a lower side of the power generation element 109 and the electrode collectors 104a, 105a and partly cover a lower side of the negative terminal 105. The first resin layer 107a is made of a resin having a good characteristic in chemical resistant for the electrolyte and thermal fusion adhesion ability such as polyethylene, modified polyethylene, polypropylene, modified polypropylene and ionomer. The second resin layer 107c is made of another resin having a high insulation performance such as polyamide and polyester resin. The metal layer 107b is a metal foil made of, for example, aluminum. A sectional structure of the negative terminal 105 and the upper and lower casings 106, 107 are as same as one of the positive terminal 106 and the upper and lower casings 106, 107 as shown in FIG. 2.

Specifically, the embodiment is characterized in the first resin layers 106a, 107a and the second resin layers 106c, 107c. A resin film is drawn to orient molecules thereof so as to have a larger tensile strength, in general, before in use. After the molecular orientation treatment, the resin film is lack of extensibility in the oriented direction. If such molecular-oriented resin film is applied to the first resin layers 106a, 107a and the second resin layers 106c, 107c, the low-profile battery 10 comes to be rigid so as not to absorb a deformation.

On the contrary, a non-molecular-oriented resin film, which is not treated with the molecular orientation treatment, allows a deformation. Therefore, in the embodiment, the non-molecular-oriented resin film is applied to the first resin layers 106a, 107a and the second resin layers 106c, 107c. However the non-molecular-oriented resin film can not stand for a tensile stress so that the upper and lower casings 106, 107 include the metal layers 106b, 107b so as to stand for the tensile stress.

The sealing films 108 as sealing means are put between the inner and outer casing 106, 107 and the positive terminal 104 or the negative terminal 105 so that the electrolyte is prevented from leaking out of the low-profile battery 10.

The non-molecular-oriented resin film is also applied to the sealing films 108. Thereby the sealing films 108 can absorb deformation.

Polyethylene, modified polyethylene, polypropylene, modified polypropylene or ionomer is applied to the low-profile battery 10, thereby the resin layers are easily and tightly adhered to the metal members thereof. Furthermore the resin layers are not molecular-oriented so that the low-profile battery 10 stands for deformation.

The numbers of the layers of the upper and lower casings 106, 107 are not limited as described above and can be properly modified. The first resin layers 106a, 107a allow to be directly adhered to the positive and negative terminals 104, 105 without the sealing films 108 put therebetween so as to be water-tight, or the upper and lower casings 106, 107 can include the sealing films 108 in advance.

The liquid electrolyte essentially consisting of organic liquid solvent with a solute of lithium salt such as lithium perchlorate and lithium fluoroborate is filled in an inner space formed by the upper and lower casings 106, 107 and the positive and negative terminals 104, 105. Thermal fusion areas 110 at both ends of the upper and lower casings 106, 107 are fused and adhered so as to prevent leakage of the electrolyte.

The low-profile battery 10 is preferably formed in a height of 1-10 mm. Produced heat is effectively radiated because the height is less than 10 mm, thereby a stress is uneasy to be produced by thermal expansion and thermal deterioration is suppressed. Further, the height is more than 1 mm so that a battery capacity is assured in a low cost.

As the organic liquid solvent, esters solvent such as propylene carbonate (PC), ethylene carbonate (EC) and dimethyl carbonate (DMC) are exemplified, however, esters solvent admixed with ethers solvent such as γ-butyrolactone (γ-BL), diethoxyethane (DEE) can be applied thereto.

The non-molecular-oriented resin film need not be applied to all the resin layers of the low-profile battery 10 but a molecular-oriented resin film can be applied to any one or more films so as to comply with any requirements about a mechanical characteristics. For example, in a case where the low-profile battery 10 needs extra strength in one or more particular directions, a molecular-oriented resin film which is molecular-oriented in the particular directions can be applied.

Modifications of the embodiment will be described hereinafter. In any of the modifications, a bi-axial molecular-oriented resin film is applied to the second resin layers 106c, 107c, of which a X-axis is more strongly drawn than a Y-axis, where the X-axis is parallel to a direction of leading out the terminals. The second resin layers 106c, 107c are not shown in FIGS. 4, 5, 7-12.

Figure 4:
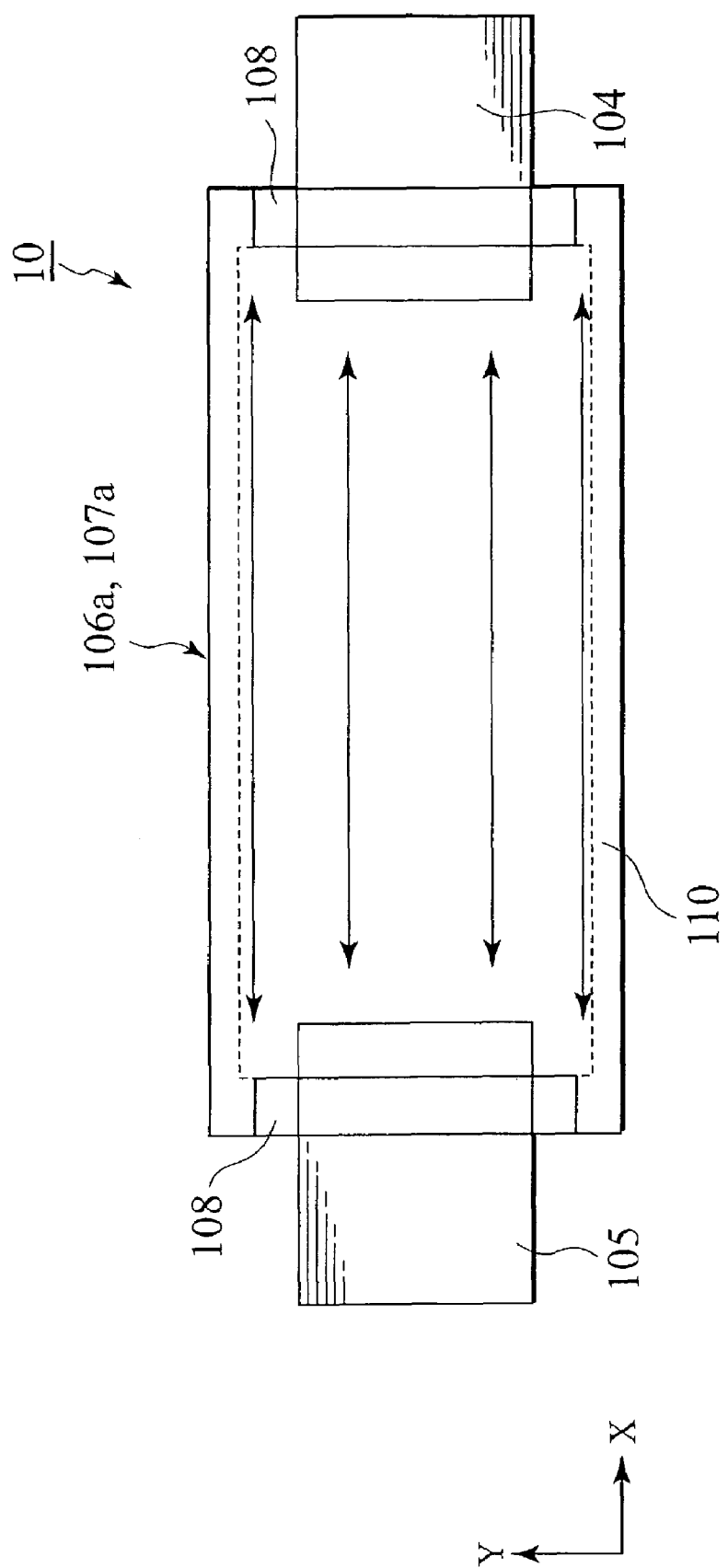
FIG. 4 is a schematic drawing showing a direction of a film orientation of a first resin layer and a seal film according to a first modification of the embodiment.

A first modification of the embodiment is shown in FIG. 4. In the first modification, a non-molecular-oriented resin film is applied to the sealing films 108 and mono-axial molecular-oriented resin film is applied to the first resin layers 106a, 107a, where the molecular-oriented axis is parallel to the X-axis.

Figure 5:
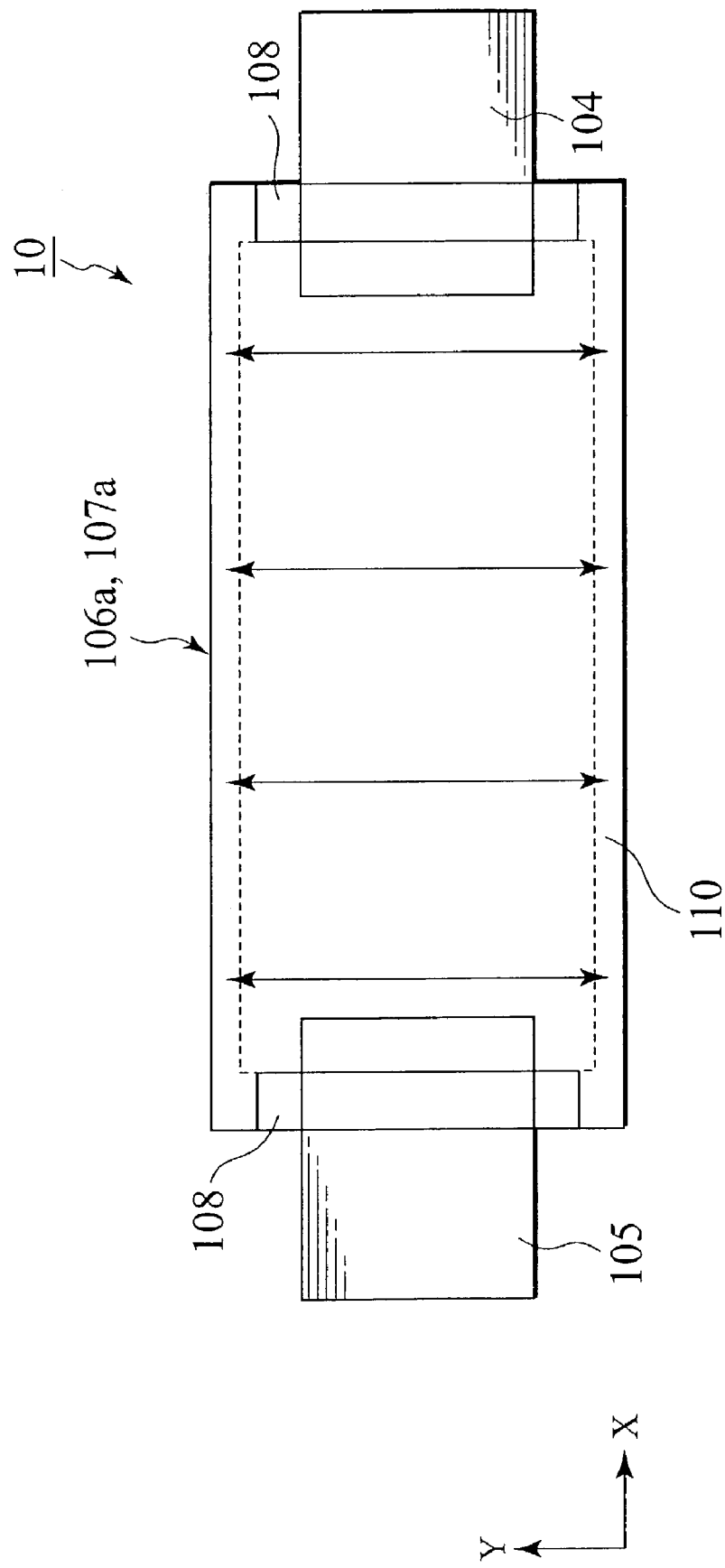
FIG. 5 is a schematic drawing showing a direction of a film orientation of a first resin layer and a seal film according to a second modification of the embodiment.
Figure 6:
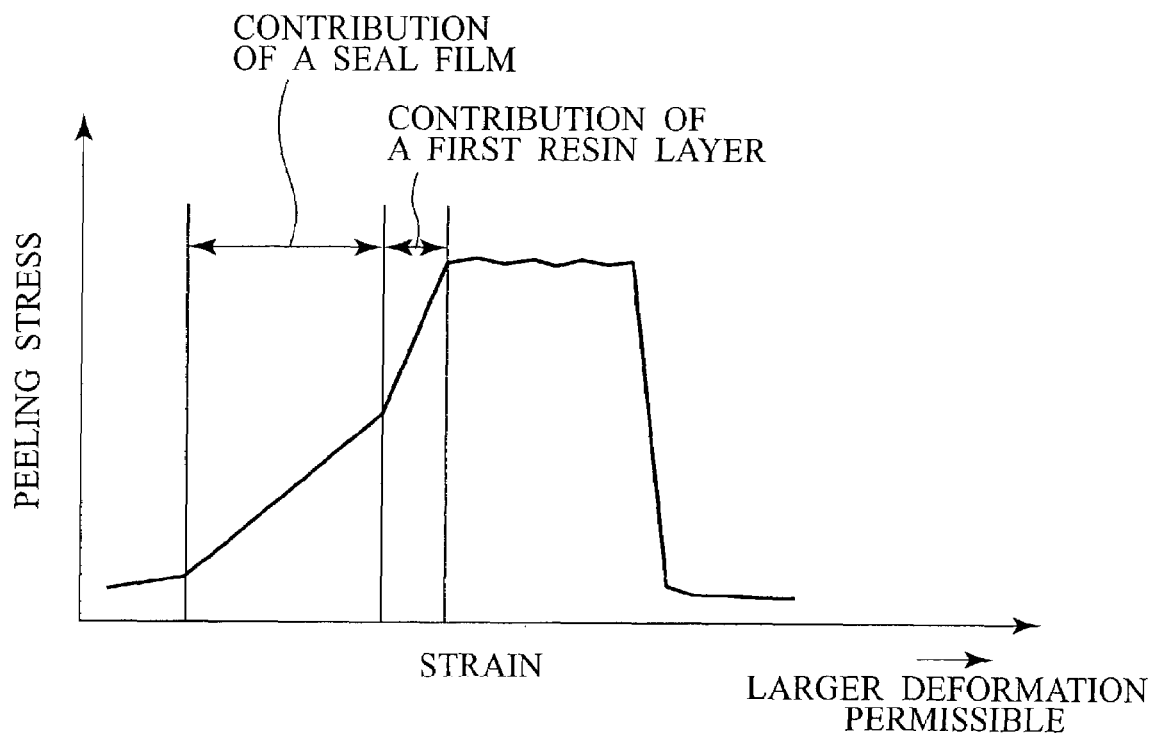
FIG. 6 is a graph showing a stress-strain relation of a lead-out terminal of the battery according to the second modification of the embodiment.

A second modification of the embodiment is shown in FIG. 5. In the second modification, a mono-axial molecular-oriented resin film is applied to the first resin layers 106a, 107a, where the molecular-oriented axis is parallel to the Y-axis, differently from the first modification. A non-molecular-oriented resin film is applied to the sealing films 108 likely as the first modification. FIG. 6 shows a stress-strain graph of the low-profile battery 10 according to the second modification, which is taken from deformation between the terminals. As shown in FIG. 6, the low-profile battery 10 allows relatively large deformation and the deformation mostly depends on deformation of the sealing films 108 to which the non-molecular-oriented resin film is applied. First, the deformation given to the low-profile battery 10 is mainly absorbed by the deformation of the sealing films 108 and, next, absorbed by deformation of the first resin layers 106a, 107a.

A third modification of the embodiment is shown in FIG. 7. In the third modification, differently from the first and second modification, a bi-axial molecular-oriented resin film is applied to the first resin layers 106a, 107a, where the molecular-oriented directions are respectively parallel to the X-axis and the Y-axis. The other constitutions of the low-profile battery 10 are as same as the first and second modifications. In the third modification, the molecular-orientation treatment is stronger in the Y-axis than in the X-axis. Length differentiation of arrows in FIG. 7 shows such a situation.

A fourth modification of the embodiment is shown in FIG. 8. In the fourth modification, a bi-axial molecular-oriented resin film is applied to the first resin layers 106a, 107a likely as the third modification, however, the molecular-orientation treatment is stronger in the X-axis than in the Y-axis. The other constitutions of the low-profile battery 10 are as same as the first to third embodiments.

A fifth modification of the embodiment is shown in FIG. 8. In the fifth modification, a mono-axial molecular-oriented resin film is applied to the first resin layers 106a, 107a likely as the first and second modifications, however, the molecular-oriented axis is at an angle of 45 degree to the X-axis differently from the first and second modifications. The other constitutions of the low-profile battery 10 are as same as the first to fourth embodiments.

According to the above modifications, the low-profile battery 10 allows deformation when the terminals are drawn or pressed because the non-molecular-oriented resin film is applied to the sealing films 108 around the terminals.

Further modifications are possible and will be described hereinafter. In the modifications, a molecular-oriented resin film is applied to the sealing films 108 and a non-molecular-oriented resin film is applied is applied to the first resin layers 106a, 107a.

Figure 12:
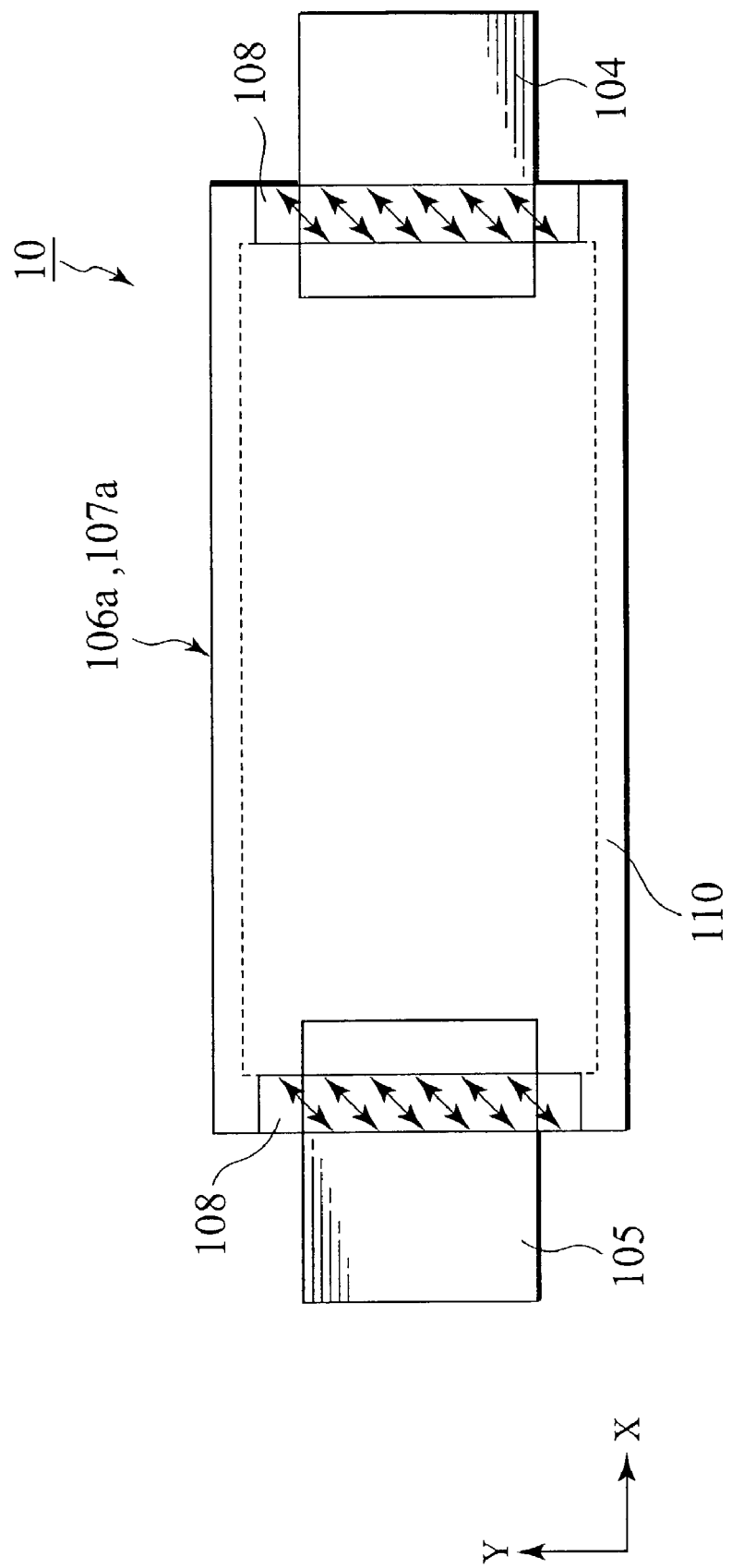
FIG. 12 is a schematic drawing showing a direction of a film orientation of a first resin layer and a seal film according to a eighth modification of the embodiment.

A sixth modification of the embodiment is shown in FIG. 10. The sealing films 108 are molecular-oriented parallel to the Y-axis. A seventh modification of the embodiment is shown in FIG. 11. The sealing films 108 are molecular-oriented in two axes respectively parallel to the X-axis and the Y-axis, where the molecular-orientation treatment is stronger in the Y-axis than in the X-axis. A eighth modification of the embodiment is shown in FIG. 12. The sealing films 108 are obliquely molecular-oriented at an angle of 45 degree to the X-axis.

According to the above modifications, a non-molecular-oriented resin film is applied to any of resin members of the low-profile battery 10 so that the low-profile battery 10 comes to stand for deformation and the electrolyte is prevented from leakage. Thereby a performance decrement or a malfunction of the low-profile battery 10 can be effectively avoided.

A plurality of the low-profile batteries can be electrically connected and assembled so as to form a group-battery. An assembly structure of the group-battery should be appropriately selected so that the group-battery has further resistance for deformation caused by an external force. The assembly structures will be described hereinafter with reference to FIGS. 13A-19.

Figure 13A:
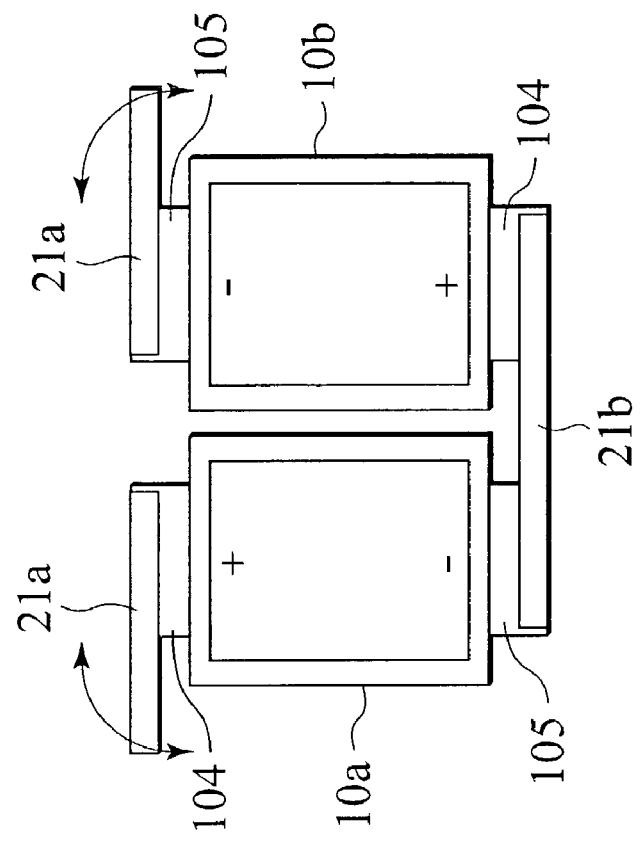
FIG. 13A is a schematic drawing of a first connection structure in which the batteries are parallel-connected.
Figure 13B:
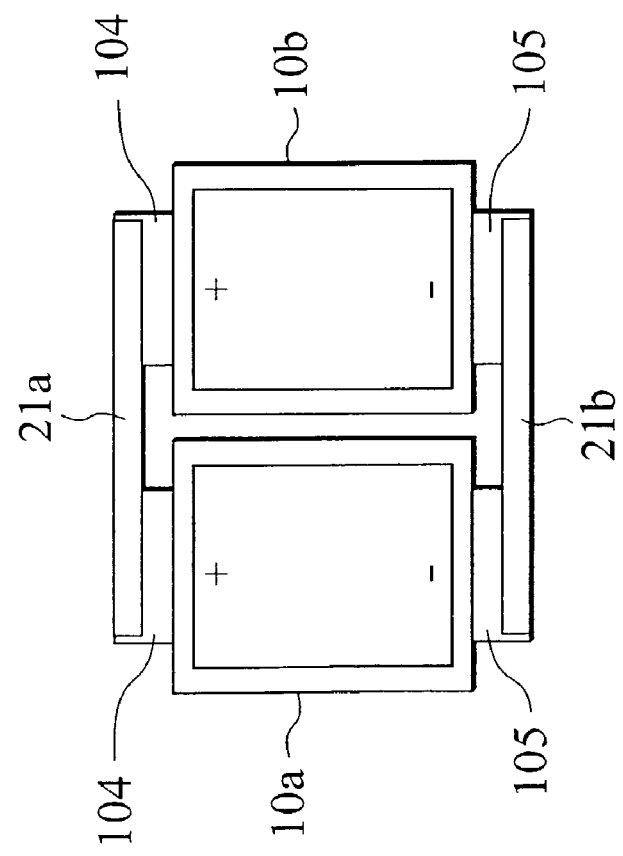
FIG. 13B is a schematic drawing in which the batteries are series-connected, shown as a comparison with FIG. 13A.

FIG. 13A shows a first structure in which a first low-profile battery 10a and a second low-profile battery 10b are oriented in the same direction, in parallel and in one plane. The positive terminals 104 are mutually connected via a first bus bar 21a. The negative terminals 105 are also mutually connected via a second bus bar 21b. The low-profile batteries 10a, 10b are electrically connected in parallel.

Figure 14A:
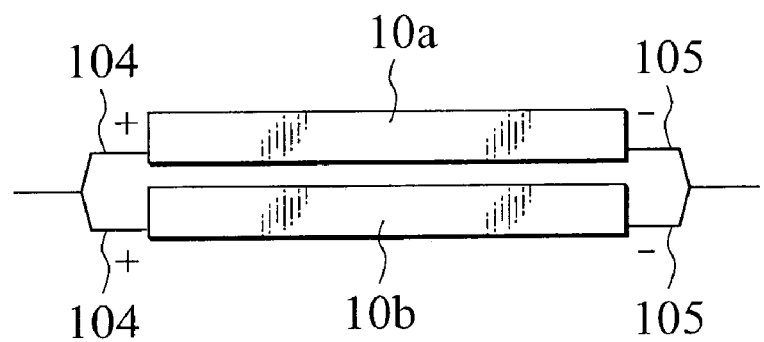
FIG. 14A is a schematic drawing of a second connection structure in which the batteries are parallel-connected.
Figure 14B:
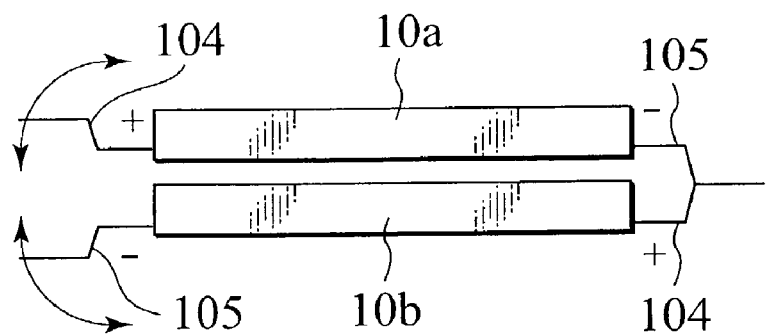
FIG. 14B is a schematic drawing in which the batteries are series-connected, shown as a comparison with FIG. 14A.

FIG. 14A shows a second structure. A first low-profile battery 10a and a second low-profile battery 10b are oriented in the same direction and in parallel. The low-profile batteries 10a, 10b are accumulated in a condition that the back sides thereof are in touch with each other. The positive terminals 104 and the negative terminals 105 of the low-profile batteries 10a, 10b are respectively fused or brazed. Thereby the low-profile batteries 10a, 10b are electrically connected in parallel.

When an external force is applied to any one of the assembly structures, the external force induces small twisting deformation. Thereby the low-profile batteries 10a, 10b as well as the assembly structures are uneasy to be broken.

Figure 15:
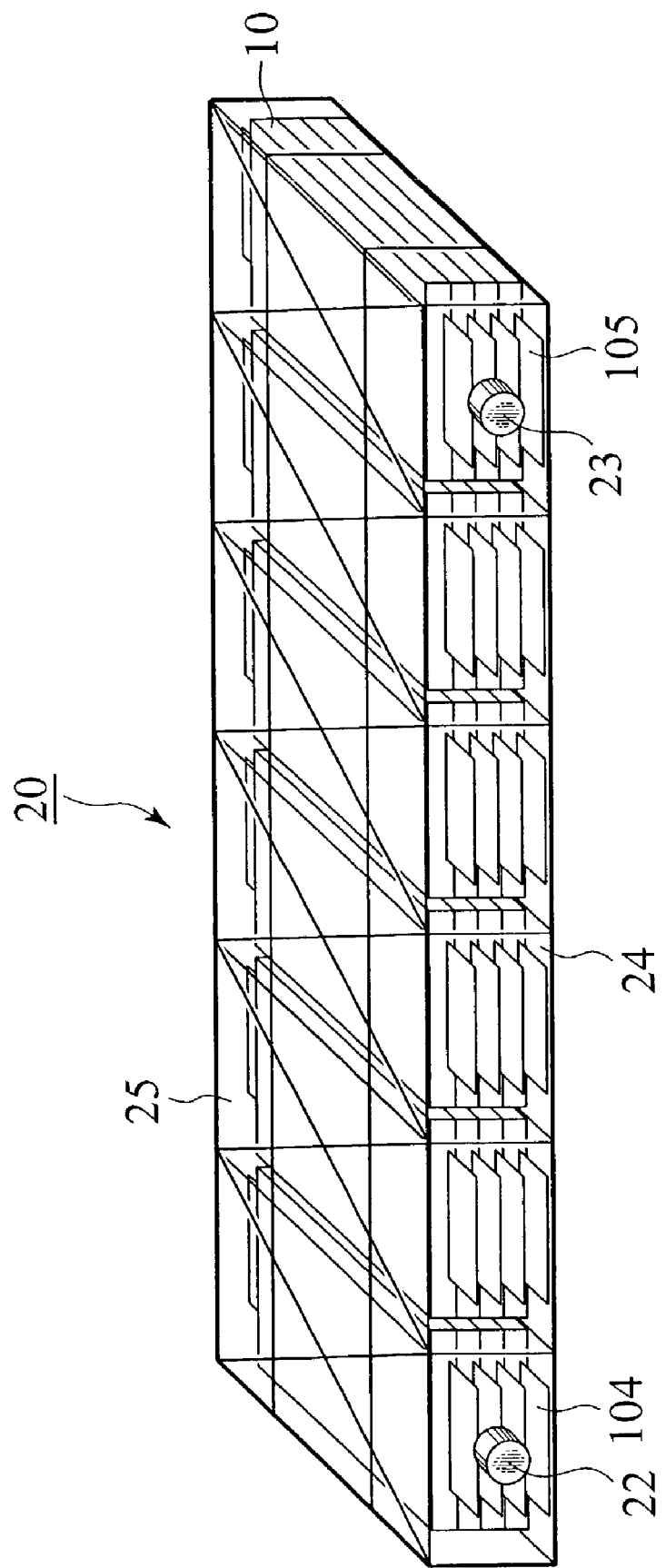
FIG. 15 is an elevational perspective view of a group-battery consisting of a plurality of the batteries according to the embodiment.
Figure 16A:
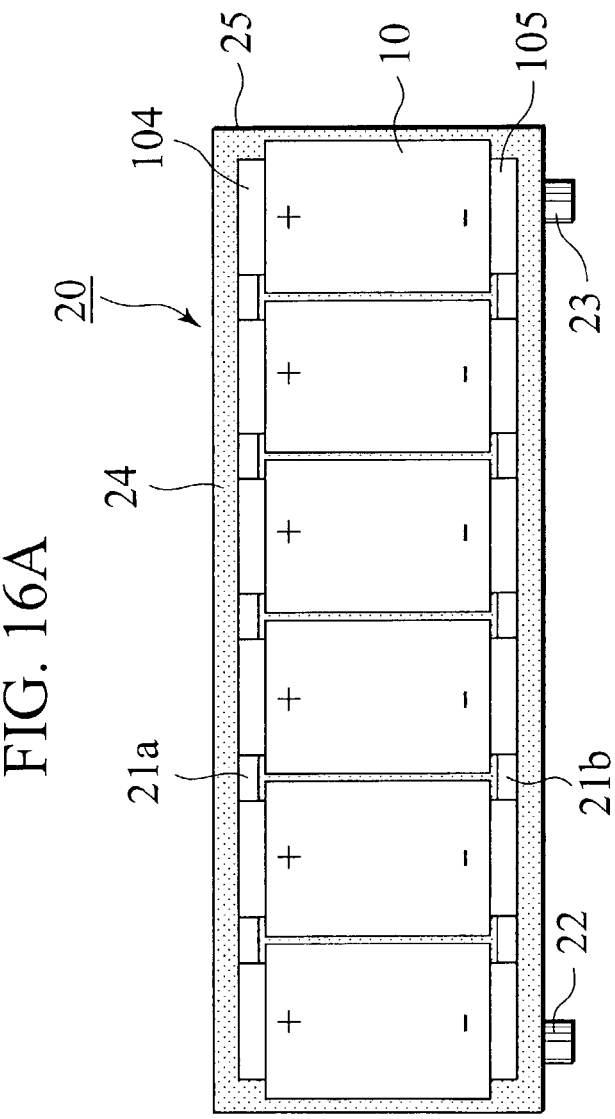
FIG. 16A is a plan view of the group-battery of FIG. 15.
Figure 16C:
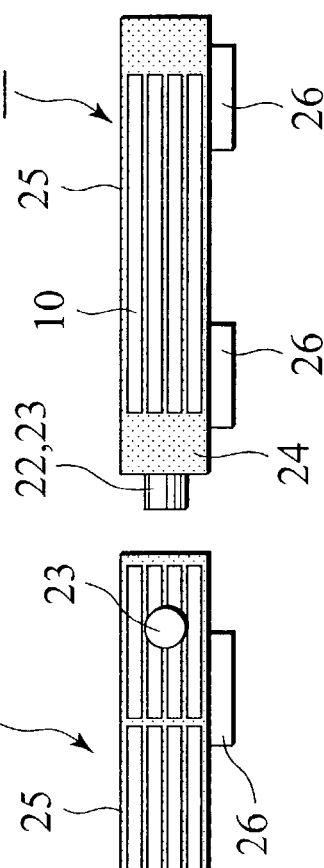
FIG. 16C is a side view of the group-battery of FIG. 15.
Figure 16B:
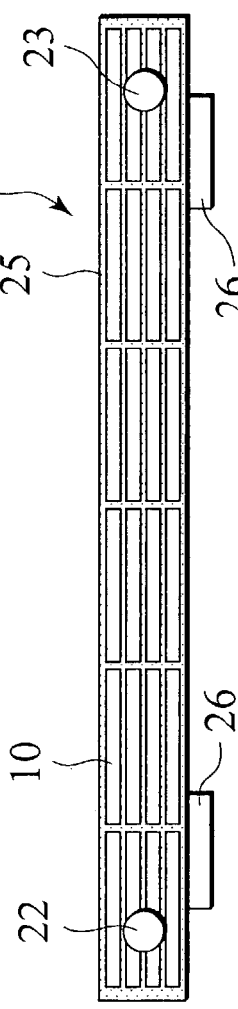
FIG. 16B is a front view of the group-battery of FIG. 15.

A plurality of the assembled low-profile batteries 10a, 10b can be further connected and assembled so as to form a group-battery 20. FIGS. 15-16C shows examples of the group-battery 20, in which twenty-four low-profile batteries, in other words, twelve sets of the assembled batteries, are connected in parallel and assembled. The group-battery 20 is provided with twenty-four low-profile batteries 10, a main positive terminal 22, a main negative terminal 23 and a cover 25. All the low-profile batteries 10 are electrically connected via a bus bar 21a and a bus bar 21b in parallel. The bus bar 21a communicates all the positive terminals 104 to the main positive terminal 22. The bus bar 22a communicates all the negative terminals 105 to the main negative terminal 23. A space formed between the group-battery 20 and the cover 25 is filled with filler 24 so as to be water-tight. Absorbers 26 are fixed to four corners of the lower side of the cover 25 so that vibration of the low-profile batteries 10 is suppressed.

Figure 17:
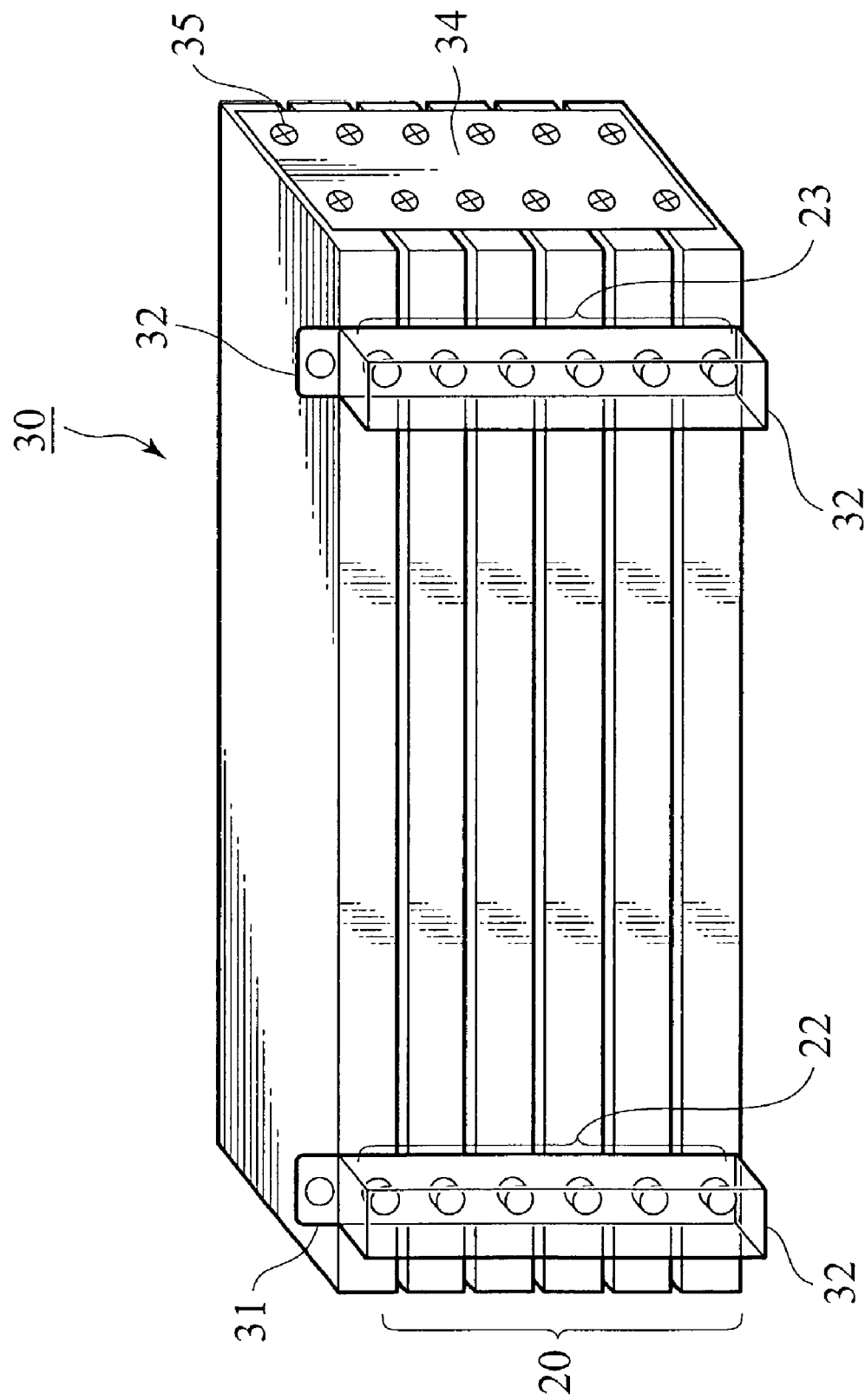
FIG. 17 is an elevational perspective view of a multiple group-battery consisting of the group-battery of FIG. 15.
Figure 18A:
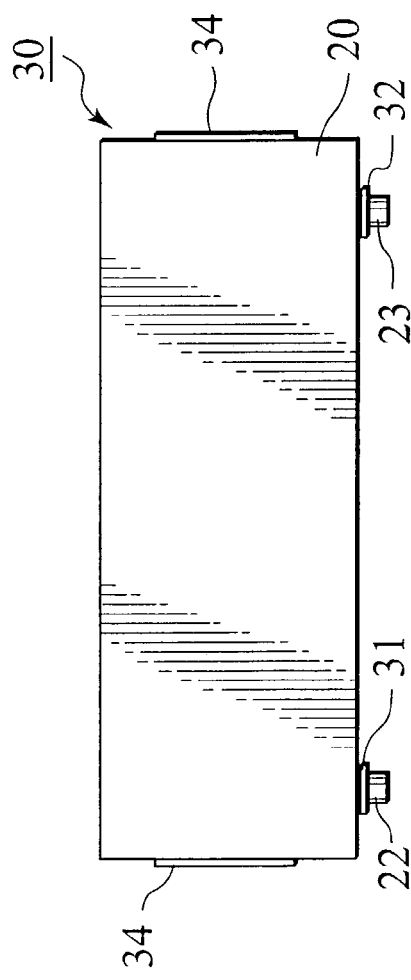
FIG. 18A is a plan view of the multiple group-battery of FIG. 17.
Figure 18C:
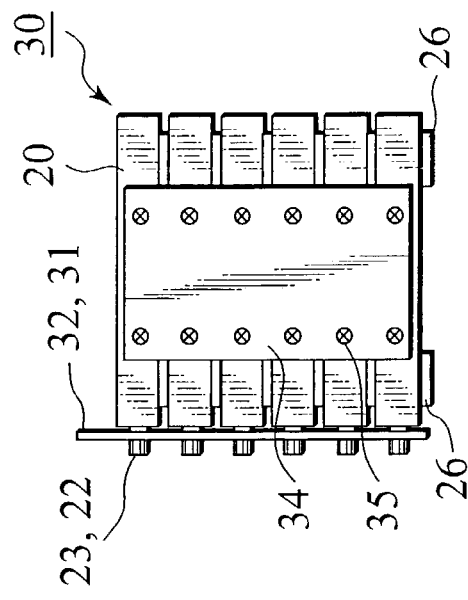
FIG. 18C is a side view of the multiple group-battery of FIG. 17.
Figure 18B:
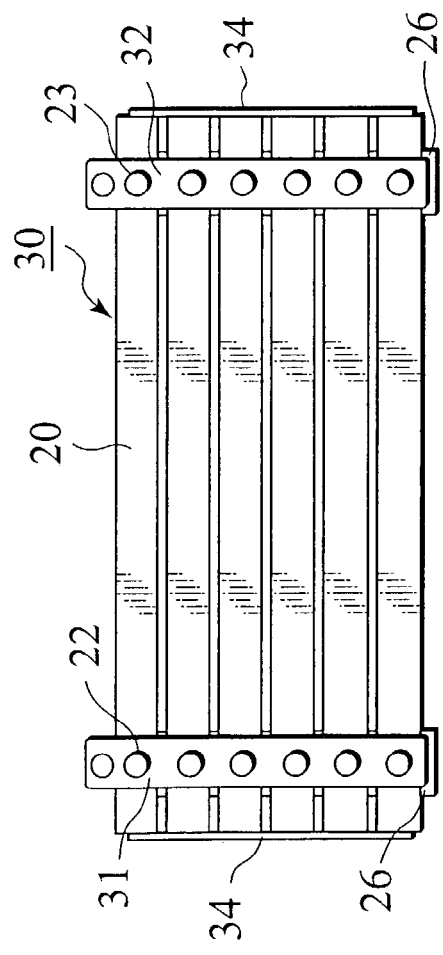
FIG. 18B is a front view of the multiple group-battery of FIG. 17.

A plurality of the group-batteries 20 are further connected and assembled to form a multiple group-battery 30. FIGS. 17-18C shows examples of the multiple group-battery 30, in which six group-batteries are connected in parallel and assembled. The group-batteries 20 are accumulated so as to be oriented in the same direction. Thereby the main positive terminals 22 and the main negative terminals 23 are arranged in two rows. The main positive terminals 22 are electrically and mutually connected with an outer positive terminal 31. The main negative terminals 23 are electrically and mutually connected with an outer negative terminal 32. The outer positive terminal 31 and the outer negative terminal 32 have substantially rectangular shape and plural holes to which the main positive and negative terminals 22, 23 are respectively press-inserted.

Insulation covers 33 made of electrically insulative material are installed to the respective outer terminals 31, 32 so that the main terminals 22, 23 are not exposed outward. The insulation covers 33 are transparently drawn in FIG. 17 and not shown in FIGS. 18A-18C. The group-batteries 20 are fixed with connection members 34 and screws 35.

As described above, proper numbers of the low-profile batteries 10 are connected and assembled so as to meet an electric power demand or a voltage demand. Such assembly procedures are simply achieved. Thereby defective products are produced in a very low possibility. Furthermore, the respective low-profile batteries are easy to be replaced in a case of maintenance.

Figure 19:
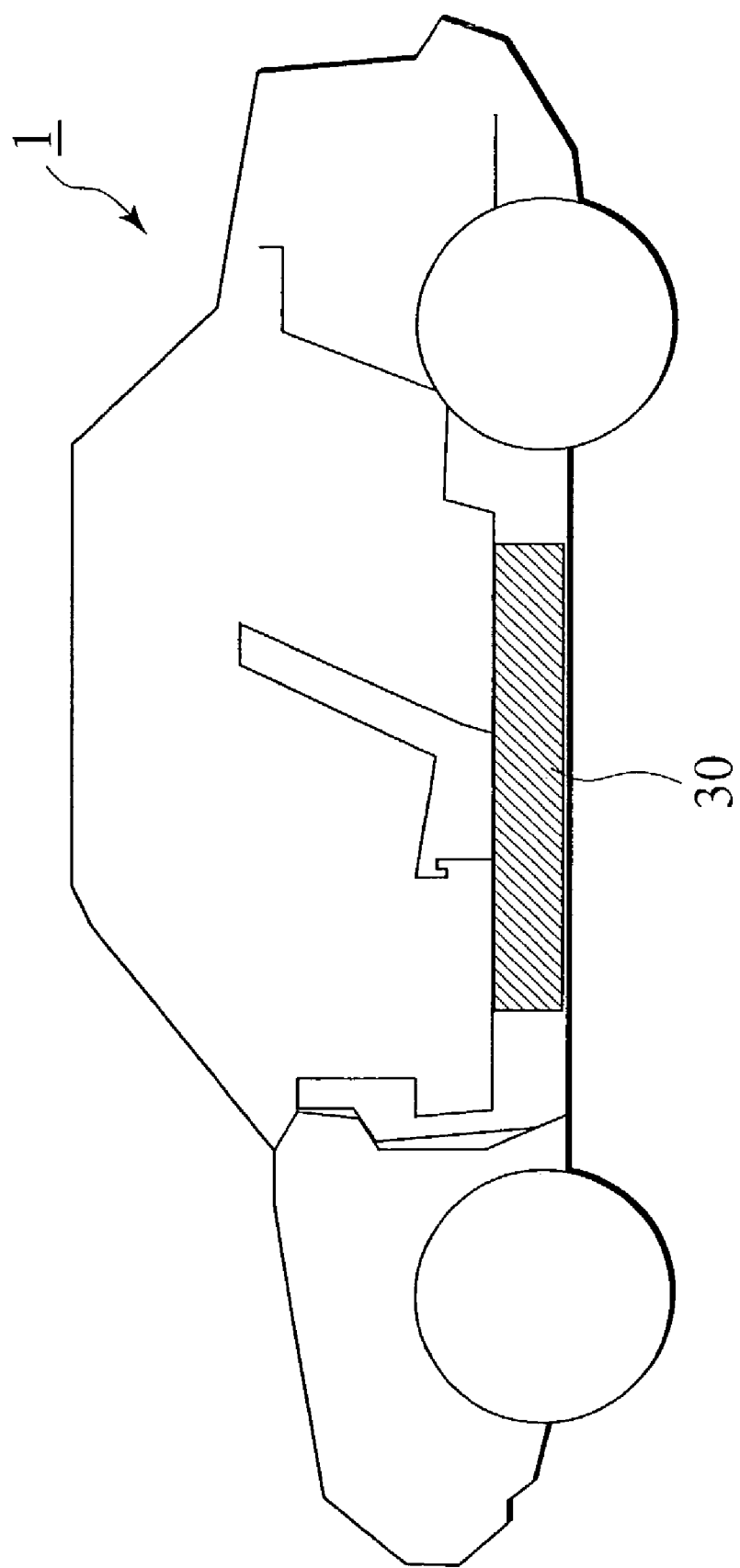
FIG. 19 is a schematic drawing of a vehicle provided with the multiple group-battery according to the embodiment.

The multiple group-battery 30 is installed in an automobile 1 in a manner as shown in FIG. 19. While the automobile 1 is running, the body of the automobile 1 is vibrated in many vibration modes. Though such vibrations cause deformation of the low-profile batteries, the present invention effectively reduces a possibility of damage of the low-profile batteries.

The numbers of the low-profile batteries 10 and group-batteries 20 and the assembly structure thereof are not limited as described above and properly decided.

EXAMPLE

Examples are described hereinafter to demonstrate an efficiency of the present invention.

Example 1

Aluminum is applied to the positive terminal and Nickel is applied to the negative terminal of the low-profile battery. A non-molecular-oriented polypropylene (PP) film is applied to the sealing films. A mono-axial molecular-oriented polypropylene (PP) film is applied to the first resin layers so that the molecular orientation is directed parallel to the X-axis. Aluminum foil is applied to the metal layer. A bi-axial molecular-oriented polypropylene (PP) film is applied to the second resin layers so that the X-axis is stronger oriented than the Y-axis. The cathodic active material is lithium manganate ($LiMnO_2$), the anodic active material is amorphous carbon and the electrolyte is a mixture of propylene carbonate and ethylmethylcarbonate. The low-profile battery of Example 1 is formed as 140 mm in height, 80 mm in width and 4 mm in thickness. Detailed conditions are described in Table 1.

TABLE 1

| | SEALING FILM | | OUTER CASING | | | | POSITIVE TERMINAL | NEGATIVE TERMINAL | THICKNESS (mm) |
| | | | FIRST RESIN LAYER | | | SECOND | | | |
| Example | MATERIAL | ORIENTATION* | MATERIAL | ORIENTATION* | METAL LAYER | RESIN LAYER | | | |
| No. 1 | non-oriented PP | — | mono-axial oriented PP | X-axis | Al | bi-axial oriented nylon | Al | Ni | 4 |
| No. 2 | non-oriented PP | — | mono-axial oriented PP | Y-axis | Al | bi-axial oriented nylon | Al | Cu | 4 |

TABLE 1-continued

| | SEALING FILM | | OUTER CASING | | | | POSITIVE TERMINAL | NEGATIVE TERMINAL | THICKNESS (mm) |
| | | | FIRST RESIN LAYER | | | SECOND RESIN LAYER | | | |
| Example | MATERIAL | ORIENTATION* | MATERIAL | ORIENTATION* | METAL LAYER | | | | |
|---|---|---|---|---|---|---|---|---|---|
| No. 3 | non-oriented PP | — | bi-axial oriented PP | X, Y-axes, stronger in X-axis | Al | bi-axial oriented nylon | Al | Ni | 4 |
| No. 4 | non-oriened PP | — | bi-axial oriented PP | X, Y-axes, stronger in Y-axis | Al | bi-axial oriented nylon | Al | Ni | 4 |
| No. 5 | non-oriented PE | — | mono-axial oriented PP | 45 degrees to X-axis | Al | bi-axial oriented nylon | Al | Ni | 4 |
| No. 6 | mono-axial oriented PE | Y-axis | non-oriented PE | — | Al | bi-axial oriented nylon | Al | Ni | 8 |
| No.7 | bi-axial oriented PE | X, Y-axes, stronger in Y-axis | non-oriented PE | — | — | — | Al | Fe | 8 |
| No. 8 | mono-axial oriented PE | 45 degrees to X-axis | non-oriented PE | — | — | — | Al | Ni | 8 |
| Comparative 1 | mono-axial oriented PP | X-axis | mono-axial oriented PP | X-axis | — | — | Al | Ni | 4 |
| Comparative 2 | mono-axial oriented PE | X-axis | mono-axial oriented PE | X-axis | — | — | Al | Ni | 4 |

*Definitions of X, Y-axes are shown in FIGS. 4, 5, 7-12

Example 1 had been tested in a tensile test and a vibration test.

The tensile test complies with a standard test method for a sealing member of an automobile described in Japanese Industrial Standards (JIS) K6830, where a relative strain is calculated in per-cent from a strain of a test piece under testing divided by one of a standard test piece. The standard test piece is Comparative Example 1 described later.

The vibration test complies with a standard test method for a rubber cushion described in JIS K6835. After testing a test piece for 20 hours, presence of exfoliation at an interface between the terminal and the sealing is observed by a visual observation and checking of smell of leaked electrolyte.

Results of the tests are described in Table 2. Example 1 allows 150% of strain relative to one of Comparative Example 1 and is not observed to have exfoliation after the vibration test. The interface between the terminal and the sealing of Example 1 after the vibration test is shown in FIG. 20. It is clearly observed that the non-molecular-oriented resin film mainly absorbs deformation of the test piece because interfaces between the non-molecular-oriented resin film and the molecular-oriented resin film are sheared.

TABLE 2

| EXAMPLE | TENSILE TEST | VIBRATION TEST |
|---|---|---|
| No. 1 | 150% | good |
| No. 2 | 160% | good |
| No. 3 | 148% | good |
| No. 4 | 158% | good |
| No. 5 | 155% | good |
| No. 6 | 150% | good |
| No. 7 | 140% | good |
| No. 8 | 145% | good |
| Comparative 1 | 100% | failure |
| Comparative 2 | 101% | failure | good: no exfoliation is observed, failure: exfoliation is observed

Example 2

The positive terminal, the cathodic active material, the anodic active material and the electrolyte of the example 2 are as same as the example 1. Copper is applied to the negative terminal of the low-profile battery. A non-molecular-oriented polypropylene (PP) film is applied to the sealing films. A mono-axial molecular-oriented polypropylene (PP) film is applied to the first resin layers so that the molecular orientation is directed parallel to the Y-axis. Aluminum foil is applied to the metal layer. A bi-axial molecular-oriented polypropylene (PP) film is applied to the second resin layers so that the X-axis is stronger oriented than the Y-axis. The low-profile battery of Example 2 is formed as 140 mm in height, 80 mm in width and 4 mm in thickness. Detailed conditions are described in Table 1.

Example 2 had been tested in the tensile test and the vibration test as described above. Results of the tests are described in Table 2. Example 2 allows 160% of strain relative to one of Comparative Example 1 and is not observed to have exfoliation after the vibration test.

Example 3

The positive terminal, the negative terminal, the cathodic active material, the anodic active material and the electrolyte of the example 3 are as same as the example 1. A non-molecular-oriented polypropylene (PP) film is applied to the sealing films. A bi-axial molecular-oriented polypropylene (PP) film is applied to the first resin layers so that the X-axis is stronger oriented than the Y-axis as shown in FIG. 7. Aluminum foil is applied to the metal layer. A bi-axial molecular-oriented nylon film is applied to the second resin layers so that the X-axis is stronger oriented than the Y-axis. The low-profile battery of Example 3 is formed as 140 mm in height, 80 mm in width and 4 mm in thickness. Detailed conditions are described in Table 1.

Example 3 had been tested in the tensile test and the vibration test as described above. Results of the tests are described in Table 2. Example 3 allows 148% of strain relative to one of Comparative Example 1 and is not observed to have exfoliation after the vibration test.

Example 4

The positive terminal, the negative terminal, the cathodic active material, the anodic active material and the electrolyte of the example 4 are as same as the example 1. A non-molecular-oriented polypropylene (PP) film is applied to the sealing films. A bi-axial molecular-oriented polypropylene (PP) film is applied to the first resin layers so that the Y-axis is stronger oriented than the X-axis as shown in FIG. 8. Aluminum foil is applied to the metal layer. A bi-axial molecular-oriented polypropylene (PP) film is applied to the second resin layers so that the X-axis is stronger oriented than the Y-axis. The low-profile battery of Example 4 is formed as 140 mm in height, 80 mm in width and 4 mm in thickness. Detailed conditions are described in Table 1.

Example 4 had been tested in the tensile test and the vibration test as described above. Results of the tests are described in Table 2. Example 4 allows 158% of strain relative to one of Comparative Example 1 and is not observed to have exfoliation after the vibration test.

Example 5

The positive terminal, the negative terminal, the cathodic active material, the anodic active material and the electrolyte of the example 5 are as same as the example 1. A non-molecular-oriented polyethylene (PE) film is applied to the sealing films. A mono-axial molecular-oriented polyethylene (PE) film is applied to the first resin layers so that the molecular orientation is directed in an angle of 45 degree to the X-axis as shown in FIG. 9. Aluminum foil is applied to the metal layer. A bi-axial molecular-oriented nylon film is applied to the second resin layers so that the X-axis is stronger oriented than the Y-axis. The low-profile battery of Example 5 is formed as 140 mm in height, 80 mm in width and 4 mm in thickness. Detailed conditions are described in Table 1.

Example 5 had been tested in the tensile test and the vibration test as described above. Results of the tests are described in Table 2. Example 5 allows 155% of strain relative to one of Comparative Example 1 and is not observed to have exfoliation after the vibration test.

Example 6

The positive terminal, the negative terminal, the cathodic active material, the anodic active material and the electrolyte of the Example 6 are as same as the example 1. A mono-axial molecular-oriented polyethylene (PE) film is applied to the sealing films so that the molecular orientation is directed parallel to the X-axis as shown in FIG. 10. A non-molecular-oriented polypropylene (PP) film is applied to the first resin layers. Aluminum foil is applied to the metal layer. A bi-axial molecular-oriented nylon film is applied to the second resin layers so that the X-axis is stronger oriented than the Y-axis. The low-profile battery of Example 6 is formed as 140 mm in height, 80 mm in width and 8 mm in thickness. Detailed conditions are described in Table 1.

Example 6 had been tested in the tensile test and the vibration test as described above. Results of the tests are described in Table 2. Example 6 allows 150% of strain relative to one of Comparative Example 1 and is not observed to have exfoliation after the vibration test.

Example 7

The positive terminal, the cathodic active material, the anodic active material and the electrolyte of the Example 7 are as same as the example 1. A steel sheet (Fe) is applied to the negative terminal. A bi-axial molecular-oriented polyethylene (PE) film is applied to the sealing films so that the Y-axis is stronger oriented than the X-axis as shown in FIG. 11. A non-molecular-oriented polyethylene (PE) film is applied to the first resin layers. The metal layer and the second resin layers are omitted. The low-profile battery of Example 7 is formed as 140 mm in height, 80 mm in width and 8 mm in thickness. Detailed conditions are described in Table 1.

Example 7 had been tested in the tensile test and the vibration test as described above. Results of the tests are described in Table 2. Example 7 allows 140% of strain relative to one of Comparative Example 1 and is not observed to have exfoliation after the vibration test.

Example 8

The positive terminal, the negative terminal, the cathodic active material, the anodic active material and the electrolyte of the Example 8 are as same as the example 1. A mono-axial molecular-oriented polyethylene (PE) film is applied to the sealing films so that the molecular orientation is directed in an angle of 45 degree to the X-axis as shown in FIG. 12. A non-molecular-oriented polyethylene (PE) film is applied to the first resin layers. The metal layer and the second resin layers are omitted. The low-profile battery of Example 8 is formed as 140 mm in height, 80 mm in width and 8 mm in thickness. Detailed conditions are described in Table 1.

Example 8 had been tested in the tensile test and the vibration test as described above. Results of the tests are described in Table 2. Example 8 allows 145% of strain relative to one of Comparative Example 1 and is not observed to have exfoliation after the vibration test.

Comparative Example 1

Aluminum is applied to the positive terminal and Nickel is applied to the negative terminal of the low-profile battery. The cathodic active material is lithium manganate ($LiMnO_2$), the anodic active material is amorphous carbon and the electrolyte is a mixture of propylene carbonate and ethylmethylcarbonate. A mono-axial molecular-oriented polypropylene (PP) film is applied to the sealing films and the first resin layers so that the molecular orientation is directed parallel to the X-axis. The low-profile battery of Comparative Example 1 is formed as 140 mm in height, 80 mm in width and 4 mm in thickness. Detailed conditions and a test result are described in Table 1, 2. Exfoliation between the terminal and the sealing films is observed after the vibration test. Strain limit of Comparative Example 1 is a standard of the examples described above so that the value is 100%.

Comparative Example 2

The positive terminal, the negative terminal, the cathodic active material, the anodic active material and the electrolyte of the Comparative Example 2 are as same as the Comparative Example 1. A mono-axial molecular-oriented polyethylene (PE) film is applied to the sealing films and the first resin layers so that the molecular orientation is directed parallel to the X-axis. The low-profile battery of Comparative Example 2 is formed as 140 mm in height, 80 mm in width and 4 mm in thickness. Detailed conditions and a test result are described in Table 1, 2. Exfoliation between the terminal and the sealing films is observed after the vibration test. Strain limit of Comparative Example 2 is 101%.

Discussion

As Clearly Demonstrated in Table 2, the Examples from 1 to 8 of the Present invention have larger strain limits relative to the Comparative Examples 1, 2 of a related art and do not have exfoliation at the interfaces between the terminals and the sealing films. The low-profile battery of the present invention is thought to be resistant to a deformation stress.

The contents of Japanese Patent Application No. 2002-186104 (filed on Jun. 26, 2002) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A battery comprising:
   a power generation element including a cathode electrode plate, an anodic electrode plate, a separator and an electrolyte, wherein the cathode electrode plate, the anodic electrode plate and the separator are stacked to form an electrode stack;
   a casing housing the power generation element and including a metal layer and a sealing portion, said casing comprising an upper casing layer and lower casing layer, wherein said sealing portion is an area where said upper casing layer is adhered to said lower casing layer;
   a terminal configured to transmit an electric power, the terminal being connected to the power generation element and led out of the casing through the sealing portion;
   a film between the terminal and the casing, the film including a resin film covering and adhering to the whole of an inner surface of the sealing portion and a sealing film wrapped around the terminal and adhering to both the terminal and the resin film, wherein the sealing film is flush with the casing at an end of the casing where the terminal exits the battery, the sealing film extends from the end of the casing to an end of the sealing portion facing the stacked electrodes, and the sealing film is flush with the end of the sealing portion facing the electrode stack.

2. The battery of claim 1, wherein the resin film includes a layer consisting essentially of a non-molecular-oriented resin not subjected to a treatment of drawing that orients a molecular structure of the layer in a direction of the drawing.

3. The battery of claim 1, wherein the casing includes a second resin film consisting essentially of a molecular-oriented resin subjected to a treatment of drawing that orients a molecular structure of the layer in a direction of the drawing.

4. The battery of claim 1, wherein the resin films are made of a resin selected from the group consisting of polypropylene, modified polypropylene, polyethylene, modified polyethylene and ionomer.

5. The battery of claim 1, wherein the terminal is made of a metal selected from the group consisting of aluminum, steel, nickel and copper.

6. The battery of claim 1, wherein:
   thickness of the battery is in a range of 1 to 10 mm.

7. The battery of claim 1, further comprising cathodic active material selected from the group consisting of lithium double oxides.

8. The battery of claim 1, further comprising cathodic active material selected from the group consisting of lithium-manganese double oxides.

9. The battery of claim 1, further comprising anodic active material selected from the group consisting of carbonaceous materials.

10. The battery of claim 1, further comprising anodic active material of amorphous carbon.

11. A group-battery comprising:
    a plurality of batteries arranged in parallel and in one direction, each of the batteries comprising:
    a power generation element including a cathode electrode plate, an anodic electrode plate, a separator and an electrolyte, wherein the cathode electrode plate, the anodic electrode plate and the separator are stacked to form an electrode stack;
    a casing housing the power generation element, the casing including a metal layer and a sealing portion, said casing comprising an upper casing layer and lower casing layer, wherein said sealing portion is an area where said upper casing layer is adhered to said lower casing layer;
    a terminal configured to transmit an electric power, the terminal being connected to the power generation element and led out of the casing through the sealing portion;
    a film between the terminal and the casing, the film including a resin film covering and adhering to the whole of an inner surface of the sealing portion and a sealing film wrapped around the terminal and adhering to both the terminal and the resin film, wherein the sealing film is flush with the casing at an end of the casing where the terminal exits each battery, the sealing film extends from the end of the casing to an end of the sealing portion facing the stacked electrodes, and the sealing film is flush with the end of the sealing portion facing the electrode stack; and
    a conductive member configured to electrically connect the terminals in parallel, wherein the batteries are electrically connected in parallel and fixed.

12. The group-battery of claim 11, wherein the batteries are accumulated on top of one another.

13. The battery of claim 11, wherein the resin film includes a layer consisting essentially of a non-molecular-oriented resin not subjected to a treatment of drawing that orients a molecular structure of the layer in a direction of the drawing.

14. The battery of claim 11, wherein the casing includes a second resin film consisting essentially of a molecular-oriented resin subjected to a treatment of drawing that orients a molecular structure of the layer in a direction of the drawing.

15. A multiple group-battery comprising:
    a plurality of group-batteries arranged in parallel and in one direction, each of the group-batteries comprising:
    a plurality of batteries arranged in parallel and in one direction, each of the batteries comprising:
    a power generation element including a cathode electrode plate, an anodic electrode plate, a separator and an electrolyte, wherein the cathode electrode plate, the anodic electrode plate and the separator are stacked to form an electrode stack;
    a casing housing the power generation element, the casing including a metal layer and a sealing portion, said casing comprising an upper casing layer and lower casing layer, wherein said sealing portion is an area where said upper casing layer is adhered to said lower casing layer;

a terminal configured to transmit an electric power, the terminal being connected to the power generation element and led out of the casing through the sealing portion;

a film between the terminal and the casing, the film including a resin film covering and adhering to the whole of an inner surface of the sealing portion and a sealing film wrapped around the terminal and adhering to both the terminal and the resin film, wherein the sealing film is flush with the casing at an end of the casing where the terminal exits each battery, the sealing film extends from the end of the casing to an end of the sealing portion facing the stacked electrodes, and the sealing film is flush with the end of the sealing portion facing the electrode stack;

a conductive member configured to electrically connect the terminals in parallel, wherein the batteries are electrically connected in parallel and fixed; and an outer terminal configured to electrically connect the conductive members, wherein the group-batteries are electrically connected in parallel or in series and fixed.

16. The multiple group-battery of claim 15, wherein the group-batteries are electrically connected in parallel.

* * * * *